United States Patent [19]

Ueda et al.

[11] 4,406,945
[45] Sep. 27, 1983

[54] HEATING APPARATUS WITH NUMERICAL DISPLAY

[75] Inventors: Shigeki Ueda, Nara; Norio Onizuka, Kashihara, both of Japan

[73] Assignee: Matsushita Electric Industrial Co. Ltd., Osaka, Japan

[21] Appl. No.: 281,193

[22] Filed: Jul. 7, 1981

[30] Foreign Application Priority Data

Sep. 5, 1980 [JP] Japan .................. 55-123749

[51] Int. Cl.³ ............................. H05B 1/02
[52] U.S. Cl. ...................... 219/506; 219/10.55 B; 219/493; 340/711
[58] Field of Search ........... 219/10.55 B, 492, 493, 219/506; 340/146.3 Y, 584, 711, 712

[56] References Cited

U.S. PATENT DOCUMENTS

| | | | |
|---|---|---|---|
| 3,866,003 | 2/1975 | Fox | 219/10.55 B |
| 4,158,759 | 6/1979 | Mason | 219/10.55 B |
| 4,340,979 | 7/1982 | Takano et al. | 219/10.55 B |

FOREIGN PATENT DOCUMENTS

| | | | |
|---|---|---|---|
| 52-24352 | 2/1977 | Japan | 219/10.55 B |
| 55-27924 | 2/1980 | Japan | 219/10.55 B |

*Primary Examiner*—M. H. Paschall
*Attorney, Agent, or Firm*—Spencer, Kaye & Frank

[57] ABSTRACT

A heating apparatus for microwave ovens, electric ovens, gas ovens and ovens of the hybrid type, includes a digital control unit and a numerical display unit. The heating apparatus further includes numerical value input means (an impulse generator) including a digit change-over switch and increment/decrement switch as means for entering a numerical value such as a heating time or a heating temperature into the digital control unit. The digit change-over switch always directs one of the hours, minutes and seconds, and the increment/decrement switch is designed so that the switch which is usually held off is closed only when the knob is moved or when the knob is depressed, for example, and the switch is returned to the original off position upon releasing the hand, thus reducing the number of setting keys, lessening the possibility of erroneous setting and simplifying the setting of heating time and heating temperature.

3 Claims, 14 Drawing Figures

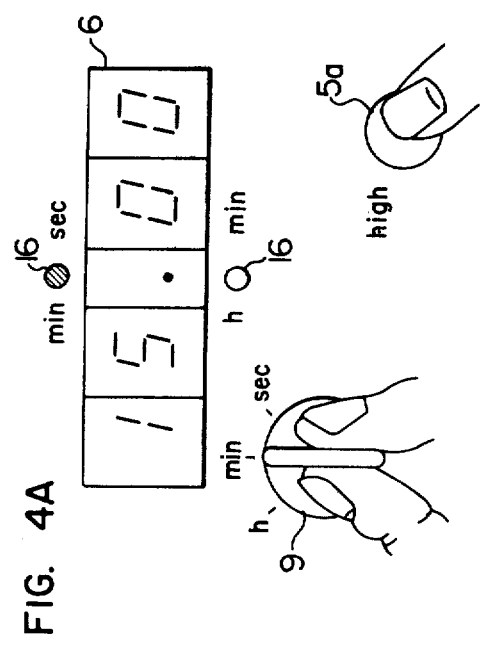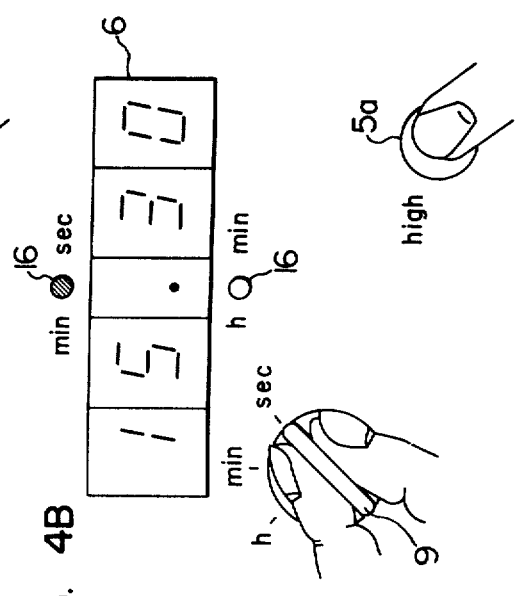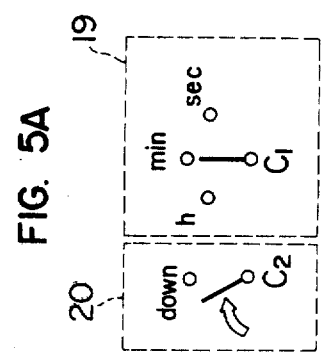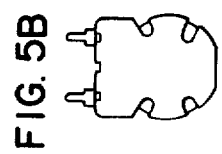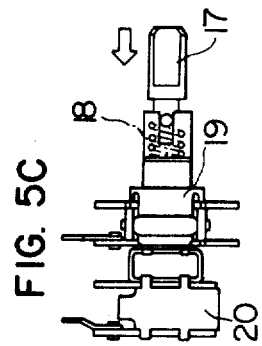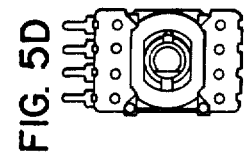

HEATING APPARATUS WITH NUMERICAL DISPLAY

BACKGROUND OF THE INVENTION

The present invention relates to a heating apparatus for electric ovens, gas ovens and ovens of the type combining the former types.

Recent developments in the field of semiconductor technology have made possible the mass production of inexpensive large-scale integrated circuits and have rapidly facilitated the use of electronic devices for the control units of equipment for civilian use (home appliances). The control panel of a heating apparatus equipped with an electronic control unit is generally constructed as follows. The control panel includes function selecting means for selecting one of a plurality of functions, numeric value input means for supplying the time or numeric value corresponding to the selected function and display means for displaying the time or numeric value. More specifically, the function selecting means may for example be comprised of a plurality of output keys for selecting a desired one of a plurality of heat outputs. Assuming that the desired one of the plurality of outputs is selected, there is still the problem of the construction of the numeric value input means. In the case of this example, the heating time must be supplied as the next step. Probably, a rotary timer is the means capable of most rapidly setting the heating temperature with little danger of making a erroneous setting. While one should not undoubtedly overlook the fact that the users have heretofore accustomed themselves to using rotary timer, its advantage that the heating temperature can be set by a "single twist" of the knob is still noteworthy. However, due to its analogic nature, the rotary timer has not been readily adapted for use with digital control systems and has not been used widely due to the need for new or improved A/D converters.

The numeric value input means used most widely with digital control systems are probably those which employ 10 numerical keys (0 to 9). In the case of these ten-key systems typified by electronic calculators, a numeric value is inputted in the order of the keys depressed while making a shift from a lower digit to a higher digit upon each depression. Thus, to input a heating time having a four-digit value, it is necessary for example to depress four of the numerical keys. As a result, it is impossible to determine the digit in which the first-depressed value is set until the depression of the numeric keys is completed. In other words, if the keys 1, 5 and 3 are inadvertently depressed in this order instead of depressing the keys 1, 5, 3 and 0 so as to input a heating time of 15 minutes and 30 seconds, a heating time of 1 minute and 53 seconds will be set. The provisions of the 10 numerical keys in addition to the function keys associated with the previously mentioned selection of functions greatly complicates the arrangement on the control panel and this places a burden on the user in searching for the desired key to depress. Furthermore, the large number of keys involves a considerable danger of depressing the adjacent keys by mistake. While such erroneous setting and erroneous operation can be tolerated as computing errors in the case of electronic calculators, in the case of a heating apparatus they will cause overheating of an object to be heated and hence the possibility a grave accident such as the production and breaking out of a fire causing the user to be burned.

With a view to decreasing the number of numerical keys and reducing the possibility of such erroneous setting, a method has been proposed in which the corresponding digit numerical keys are provided for the respective digits of a display unit. For example, in the case of a 4-digit display unit, four digit numerical keys are provided for the four digit places. For example, the four keys respectively correspond from top to bottom to "10 minutes digit", "1 minute digit", "10 seconds digit" and "1 second digit" and thus any numeric value can be entered into each of the digits. It is so arranged that the numeric value to be entered can be entered by repeatedly depressing the corresponding key a desired number of times or by automatic increments made so long as the key is depressed continuously, and it is only necessary to release the key upon entering the desired numeric value. FIG. 3 shows the operations required for setting a heating time of 15 minutes and 30 seconds.

This digit numerical key system is advantageous in that the correspondence between the display unit and the keys is very clear as will be seen from FIG. 1, that the possibility of erroneous setting is reduced greatly as compared with the 10-key system, that the number of keys can be reduced, that the danger of erroneous depression is reduced due to the provision of the numerical keys in a zone different from that of the function keys, that the hardware of the control system can be simplified and so on. However, this system is disadvantageous in that as compared with the previously mentioned rotary timer, the operating feeling is quite different causing a feeling of strangeness on the part of the user and that it is difficult to correct any excessively advanced numeric value. For instance, assume that a number "6" is erroneously set in the minutes digit in which "5" is to be set. In such a case, the correction requires to clear the number entirely by an erase key and then make the setting all over again. Alternatively, it is conceivable to connect each of the digit displays to a scale-of-six or decimal ring counter such that the occurrence of any overflow does not result in a carry to a higher digit. Thus, if the number "6" is set erroneously, the minutes digit key is continuously depressed to advance the count—"9"→"0"→"1"→—until the number "5" is set again. However, this requires considerable time and moreover the user inevitably has a feeling of strangeness since the count is returned to "10 minutes" after the display of "19 minutes".

It will be seen from the foregoing that the known numeric value input means of heating apparatus still leave considerable room for investigation and thus there exists a need for a numeric value input means which is easy to operate, has less danger of erroneous operation, requires less time for setting and is excellent from the standpoint of safety.

It is therefore the object of the present invention to provide an improved numeric value input means for heating apparatus equipped with a digital control unit, which is operable with a feeling close to that of the prior art rotary timer and which has less possibility of giving a strong feeling of strangeness to the user, thereby preventing the occurrence of overheating due to any erroneous operation and reducing the operating time by providing the numeric value input means with a "setback" function.

It is another object of the present invention to provide an improved numeric value input means for heating apparatus, which is comprised of only a single operating knob thus relieving the user of his burden of looking for the desired key as in the past and which is furthermore physically separated from various other keys forming function selecting means, thus practically completely eliminating the possibility of erroneously operating the one of the two.

It is still another object of the present invention to provide such numeric value input means which can also be used skillfully for both time setting and temperature setting purposes.

SUMMARY OF THE INVENTION

In the present invention, a heating apparatus includes a digital control unit and numerical value input means (impulse generator) including a digit change-over switch and an increment/decrement switch to serve as means of inputting the heating time, heating temperature, etc. The digit change-over switch is designed so that one of the hours, minutes and seconds is always directed and the increment/decrement switch is so constructed that the switch is usually held off and only upon depression of the knob the switch is moved into the on position from which it is movable back into the original off position by a spring upon removal of the hand from the knob. Disposed on a control panel are this impulse generator as well as output selecting means (output keys) for selecting the output of a heating means such as a magnetron, whereby the heating time or the heating temperature corresponding to the selected output is applied by the impulse generator for the length of time during which the output selecting means is depressed. The application of a numeric value is effected by adding up the corresponding digits in accordance with the position (the hours, minutes or seconds) directed by the digit change-over switch of the impulse generator. When the increment/decrement switch is turned on, the numeric value in the position directed by the digit change-over switch is also decreased successively. A numerical display unit is designed so that it serves as an hours and minutes indicator if the preset time is greater than 60 minutes and it serves as a minutes and seconds indicator if the preset time is less than 60 minutes. The magnitude of the heating time and the position of the digit changeover switch (whether the hours position or not) are determined by a main control unit and are indicated by turning on or flashing on and off the hours and minutes status display or the minutes and seconds status display of the display unit.

BRIEF DESCRIPTION OF THE DRAWING

Other objects, advantages and features of the invention will be apparent from the following description taken in conjunction with the accompanying drawings, in which:

FIGS. 4A and 4B are diagram showing by way of example an input operation performed by an impulse generator according to the invention;

FIGS. 5A to 5D show the construction of the impulse generator;

DESCRIPTION OF THE PREFERRED EMBODIMENTS

Figure 1:
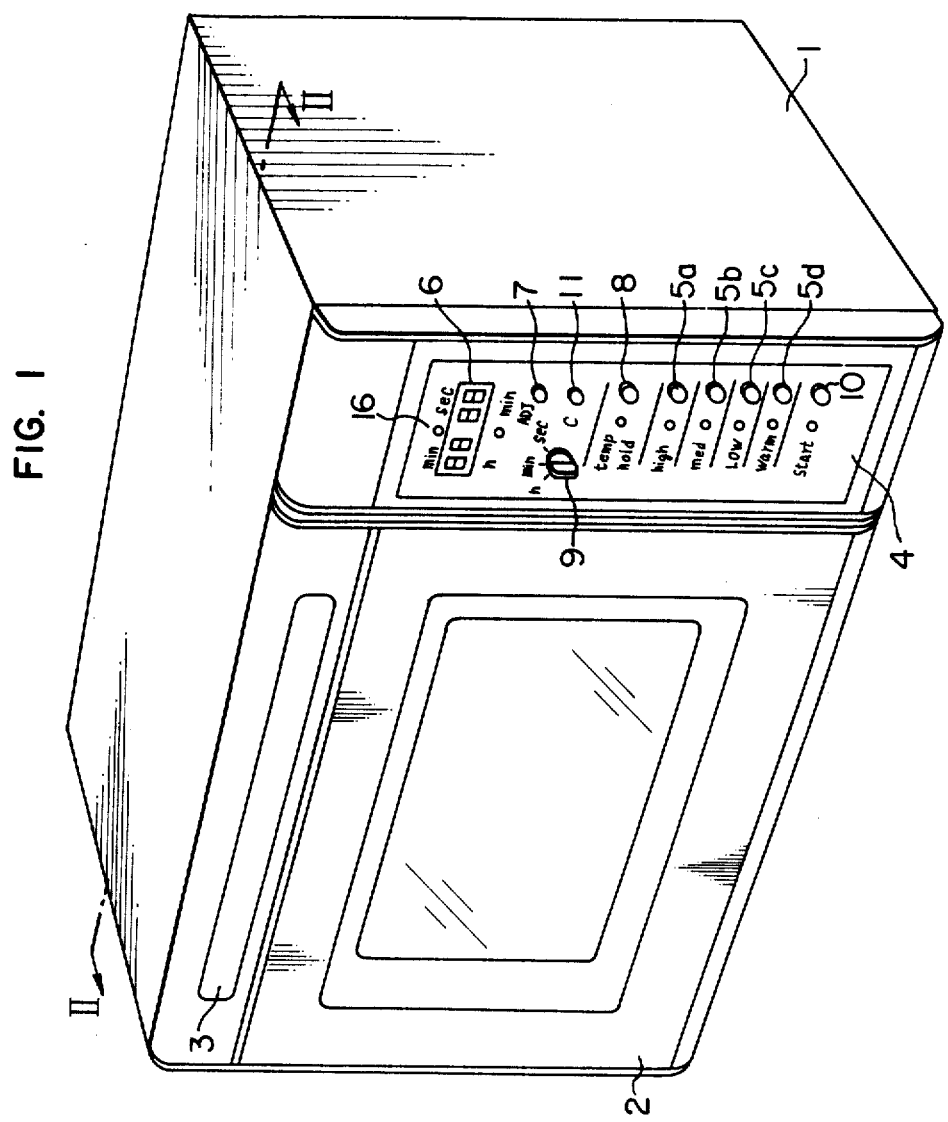
FIG. 1 is a perspective view of a heating apparatus proper showing an embodiment of the present invention.

Referring now to FIG. 1, there is illustrated a perspective view of a microwave heating apparatus showing an embodiment of the present invention. A door 2 is pivotably hinged to the front part of the apparatus proper 1 so as to cover its heating chamber. A handle 3 is provided to open and close the door 2. A control panel 4 is provided with function selecting means comprising output keys 5a to 5d for selecting a desired one of four levels of outputs, i.e., high, medium, low and warm outputs. Other function selecting means are provided including a time setting key or ADJ key 7 for displaying the time on a numerical display unit 6 and a temperature hold key 8 employing a temperature probe for holding a preset temperature during temperature controlled heating.

In accordance with the present invention, there is provided numerical value input means comprising an impulse generator having a rotary knob 9 as an actuator. FIG. 4 shows by way of example an input operation performed by this numerical value input means and the operation will be compared with a conventional input operation later.

Further provided on the control panel 4 are a start key 10 for directing the start of heating and a clear key 11 for cancelling a preset program. Excepting the ADJ key 7 and the clear key 11, the function selecting keys are each provided with the associated function status display. Each of the displays comprises an LED, shown by a small circle on the left side of each key.

In addition, a unit display 16 similarly comprising an LED is provided on each of the upper and lower sides of the numerical display unit 6. This is due to the fact that the 4-digit display unit 6 is adapted for use as a minutes and seconds indicator or an hours and minutes indicator and a corresponding one of the indicating lights is turned on to inform clearly the user of a change-over from one display mode to another or vice versa.

Figure 2:
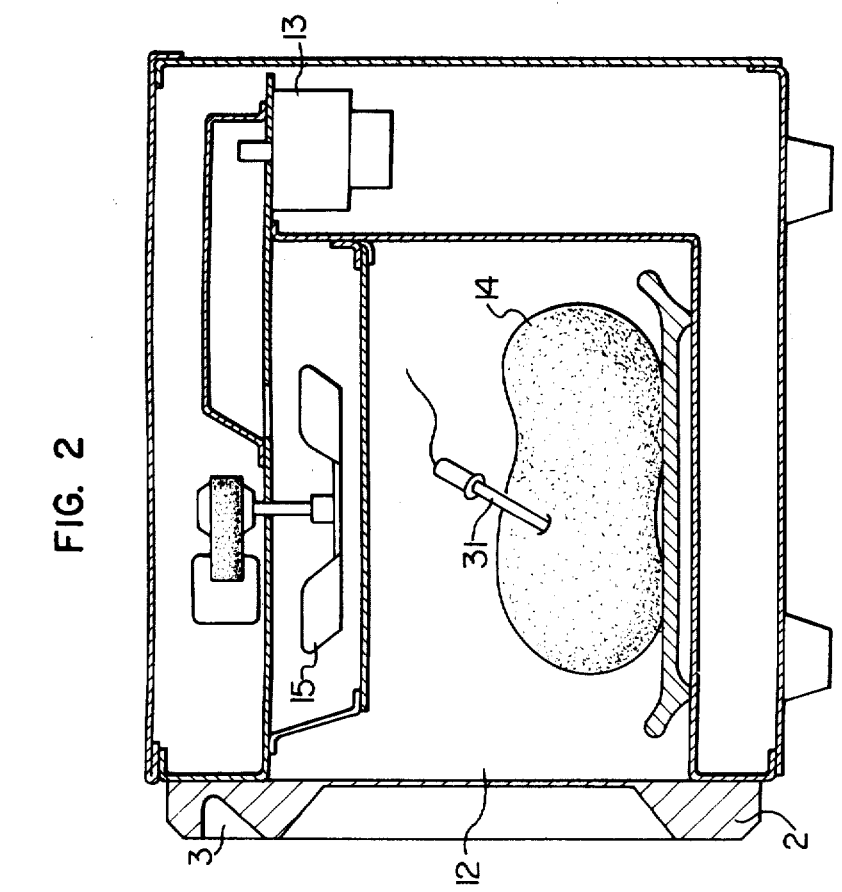
FIG. 2 is a sectional view (II—II') of FIG. 1.

Referring now to FIG. 2, the construction of the heating means will be described. Microwave energy is directed into a heating chamber 12 from a magnetron 13 forming a heat source. An object 14 to be heated is placed inside the heating chamber 12 and is heated by the microwave energy. The front opening of the heating chamber 12 is covered by the door 2 and the microwave energy is prevented from leaking out. Numeral 15 designates a stirrer fan for stirring the microwave energy to ensure a uniform electric field intensity and thereby reduce non-uniformity in heating the object 14. While the present embodiment will be described as applied to a microwave heating apparatus, it should be apparent to those skilled in the art that the invention is applicable to electric ovens, gas ovens and ovens of the type combining both of these types. In the latter cases, the heat source 13 may be an electric heater, a gas burner or a combination of the two types.

Figure 3A:
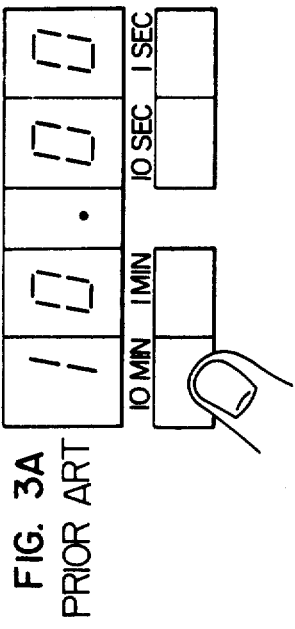
FIGS. 3A, 3B and 3C are diagrams showing by way of example a prior art input operation performed by means of digit numerical keys.
Figure 3B:
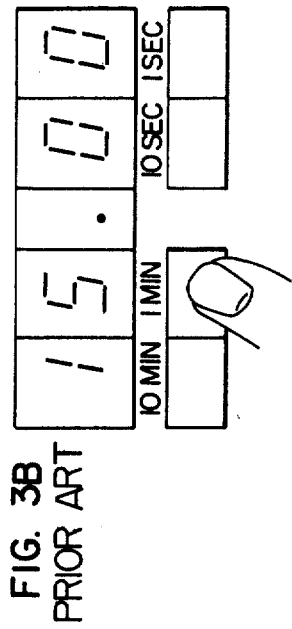
Figure 3C:
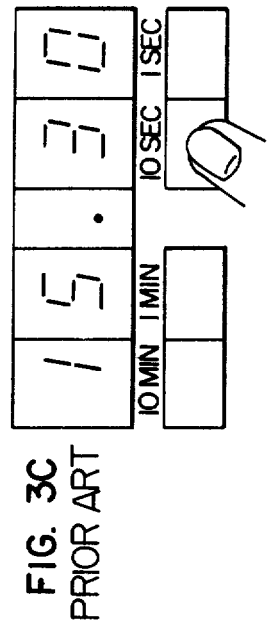

Referring now to FIGS. 3 and 4, a comparison will be made between the input operation performed by the impulse generator according to the invention and that performed by the digit numerical key constituting the prior art technique which is closest to the present invention. Although the exemplary input operation by the digit numerical keys has already be described in connection with the prior art numerical keys, the operation will be described again briefly. FIGS. 3A to 3C show the operations for entering a heating time of 15 minutes and 30 seconds. Firstly, a 10-MIN digit key is tapped once (FIG. 3A). This enters 10 minutes. Then the next 1-MIN digit key is tapped five times so that 5 minutes are added and this operation, coupled with the previous operation, results in the setting of 15 minutes (FIG. 3B). Then the finger is moved onto the next 10-SEC digit key and the key is tapped three times, thus entering 30 seconds and thereby completing the setting of 15 minutes and 30 seconds (FIG. 3C). The advantages and disadvantages of this system have been described in detail previously.

In accordance with the impulse generator according to the invention, as shown in FIGS. 4A and 4B, the impulse generator knob 9 is held by the left hand and the desired digit is selected. Let it be assumed that a "min" position is selected. Then, if any desired one of the output keys, such as, the "high" key 5a is depressed, as long as the high key 5a is depressed, the counter provided in the control system incrementally enters the heating time corresponding to the "high" key 5a (FIG. 4A). In other words, the heating time is set in the minutes digit of the display unit 6 (the columns 1 and 2) while being increased as "0→1→2——→14→15" at a constant rate. This rate is selected for example at about 0.4 second/unit. In this case, in order to indicate that the display unit 6 is functioning as the minutes and seconds indicator, the upper unit display 16 or the min/sec status display is turned on. The selection of the unit displays 16 is performed in response to a main control unit which determines the selected position of the impulse generator and the entered heating time and the proper one of the upper and lower status displays is selected so as to be turned on or flashed on and off.

After the setting of 15 minutes has been completed, if the user turns the impulse generator knob 9 to the right and selects the "sec" position, the remaining 30 seconds will be entered (FIG. 4B) in the same manner as shown in FIG. 4A. After setting the desired 15 minutes and 30 seconds, if the output key 5a is released, the entry of the heating time corresponding to the high power is completed.

It will be seen from the foregoing that the input operation by the impulse generator is advantageous in that the correspondence between the display unit and the impulse generator is quite clear as in the case of the digit numerical keys, that the possibility of erroneous setting is reduced, that the number of keys is reduced, that the position of the impulse generator is clearly distinguished from the zone of the function keys with the resulting reduction in the possibility of erroneous depression and that the hardware of the control system is simplified. In addition, the following disadvantages or the disadvantages of the digit numerical keys are overcome. Firstly, the operational feel is similar to that of the conventional rotary timer, that the operating means associated with the numerical value input means comprises only the single knob 9 and that the user need not successively depress different keys with the result that the user has no feeling of considerable strangeness and the user can readily accustom himself to the input operation. Secondly, if any erroneous numerical value is entered by mistake, the value can be corrected easily. Although not described in any way in connection with the input operation of FIGS. 4A and 4B, these points will now be described with reference to FIGS. 5A to 5D.

FIGS. 5A to 5D show in detailed or partial views the external appearance of the impulse generator, the figures being drawn by the third-angle system (5B to 5D). A shaft 17 extends through the apparatus proper and is biased by an internal spring 18 toward the front of the apparatus (in a direction opposite to the direction of the arrow). Its switch section comprises a pair of ganged switches or an digit change-over switch 19 and a increment/decrement switch 20. Their connection diagrams are illustrated in FIG. 5A. The increment/decrement switch 20 is usually held in the off position and it is turned on (or moved in the direction of the arrow) only when the shaft 17 is depressed by the knob 9. The digit change-over switch 19 closes any one of the "h", "min" and "sec" contacts irrespective of the position of the shaft 17. Symbol $C_1$ designates a common terminal.

Figure 6:
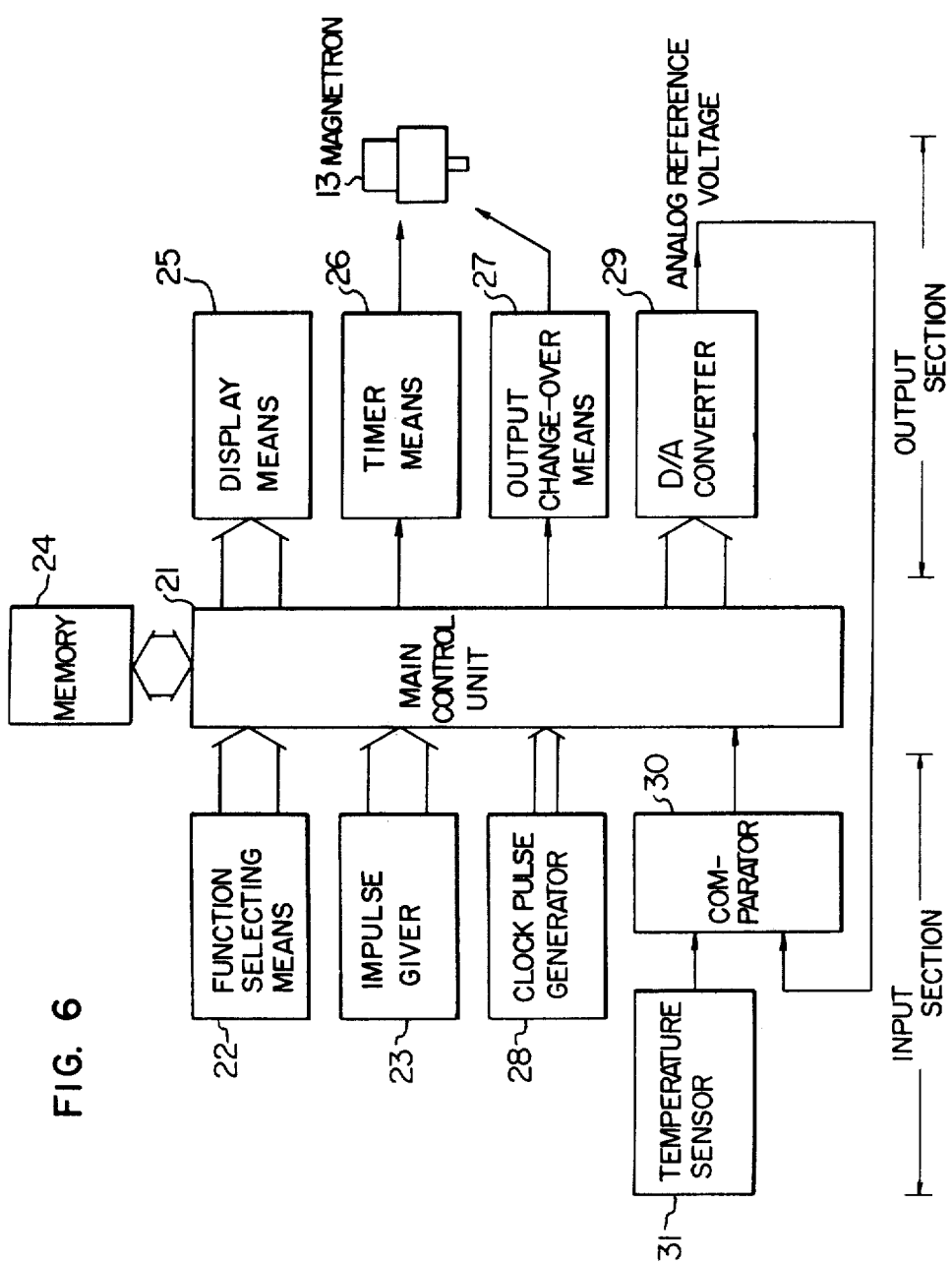
FIG. 6 is a block diagram of a control system used with the apparatus of the invention.

The construction of the control system required for giving practical effect to the present invention will now be described. FIG. 6 is a block diagram of this control system.

A main control unit 21 monitors the entire control system, decodes the input data supplied by the output keys and the start key of funtion selecting means 22 and the heating time supplied from an impulse generator 23, stores the results in a memory 24 and delivers the desired data to display means 25. In other words, the heating time is delivered to the numerical display unit, the selected function to the function status display means and the unit of the numerical display unit to the unit display means. In addition, the main control unit 21 starts the current flow to timer means 26 in response to the start key, operates the magnetron 13 to direct the microwave energy into the heating chamber 12 and varies the microwave output of the magnetron 13 by for example switching on and off the current flow to the magnetron 13 by output change-over means 27 so as to apply the output corresponding to the selected output key to an object to be heated. The control unit 21 also counts the pulses from a clock pulse generator 28 to compute the remaining heating time in the memory 24 and upon expiration of the heating time the main control unit 21 turns off the timer means 26 to terminate the current supply to the magnetron 13 and thereby to complete the heating operation.

In accordance with the present embodiment, the heating apparatus further includes a temperature probe comprising a temperature sensor 31 mounted in the forward end of a metal tube and thus it has a heating temperature controlling function for sensing the internal temperature of the object to be heated so as to directly control the heating in accordance with the heated temperature. In this way, it is possible to select any effective one of two heating modes, i.e., an indirect heating time control performed by the timer in response to the object to be heated and a direct heating temperature control performed by the temperature sensor.

The temperature control is performed in the following way. Firstly, the main control unit 21 supplies a reference voltage in the form of a digital signal to a D/A converter 29. The D/A converter 29 converts the digital signal to an analog reference voltage and applies it to a comparator 30. The comparator 30 compares the analog reference voltage with the output voltage value of a temperature sensor 31 so as to inform the main control unit 21 as to whether the object to be heated has attained the preset temperature. In response to the comparison signal to main control unit 21 controls the timer means 26 and governs the current supply to the magnetron 13.

In the case of the conventional ten-key system, the method of entering a heating temperature into the main control unit 21 has been usually such that if a heating temperature of 85° C., for example, is to be set in the like manner as the entry of the heating time after the selection of the output, the numerical keys 8 and 5 are depressed in this order. In the case of the digit numerical keys it has been the practice to tap each of the corresponding keys a desired number of times or to tap a separate "temp" key to effect the incrementation at a rate of 5° C. per tap, for example, thereby setting any desired temperature. In accordance with the present invention, a very useful "decrement" function is provided. Thus, the control system is constructed such that the impulse generator is also utilized effectively for temperature setting purposes. In other words, when the insertion of the temperature sensor 31 is detected by the comparator 30, the main control unit 21 changes the control system to a temperature mode. The display means gives a disply of "00° C". Then, if one of the output keys, e.g., the medium key 5b is selected, the heating temperature corresponding to this output key is entered so long as the key is depressed. Initially, a controllable minimum temperature is displayed as "30° C.", for example, and the temperature is increased at a constant rate of about 0.4 sec/unit in the like manner as in the case of the heating time. Here, one unit represents a minimum temperature that can be set and the value is increased in increments of 2° C., for example. In this case, the digit change-over switch 19 is rendered ineffective and the preset value is increased at the same rate irrespective of the position of the switch 19. On the contrary, if the increment/decrement switch 20 is depressed, the decrementation of the value is started and the value is successively decreased at the same rate until it reaches the minimum value of 30° C.

With the digit change-over switch 19, it is possible to separately enter the data in a "10° C." digit and a "1° C." digit. If a comparison is again made with the digit numerical keys in this respect, it is of course possible to provide a setback function for the digit numerical keys and thus the comparative advantages of the present invention must be clarified. As regards the arrangement for providing the digit numerical keys with setback keys, it will be necessary to use one or the other of two possibilities, i.e., providing a total of eight keys including four advance keys and four setback keys for the digits and providing a separate advance/setback selection key which is pressed to select one or the other of the two prior to depressing the digit numerical keys. While the former has an excellent operating quality, the number of the numerical keys which was reduced with much trouble is again increased to 8 and the feeling of complexity of the control panel and the complexity of the hardware again become close to those of the conventional ten-key system. The latter increases the number of operating steps by one and thus is troublesome, although the number of keys is not increased. The setback function according to the invention is advantageous in that it needs no specially designed operating member but only a single knob which is capable of directing both the digit changeover operation and the decrement operation and the hardware is used as such in its simple form.

Figure 7:
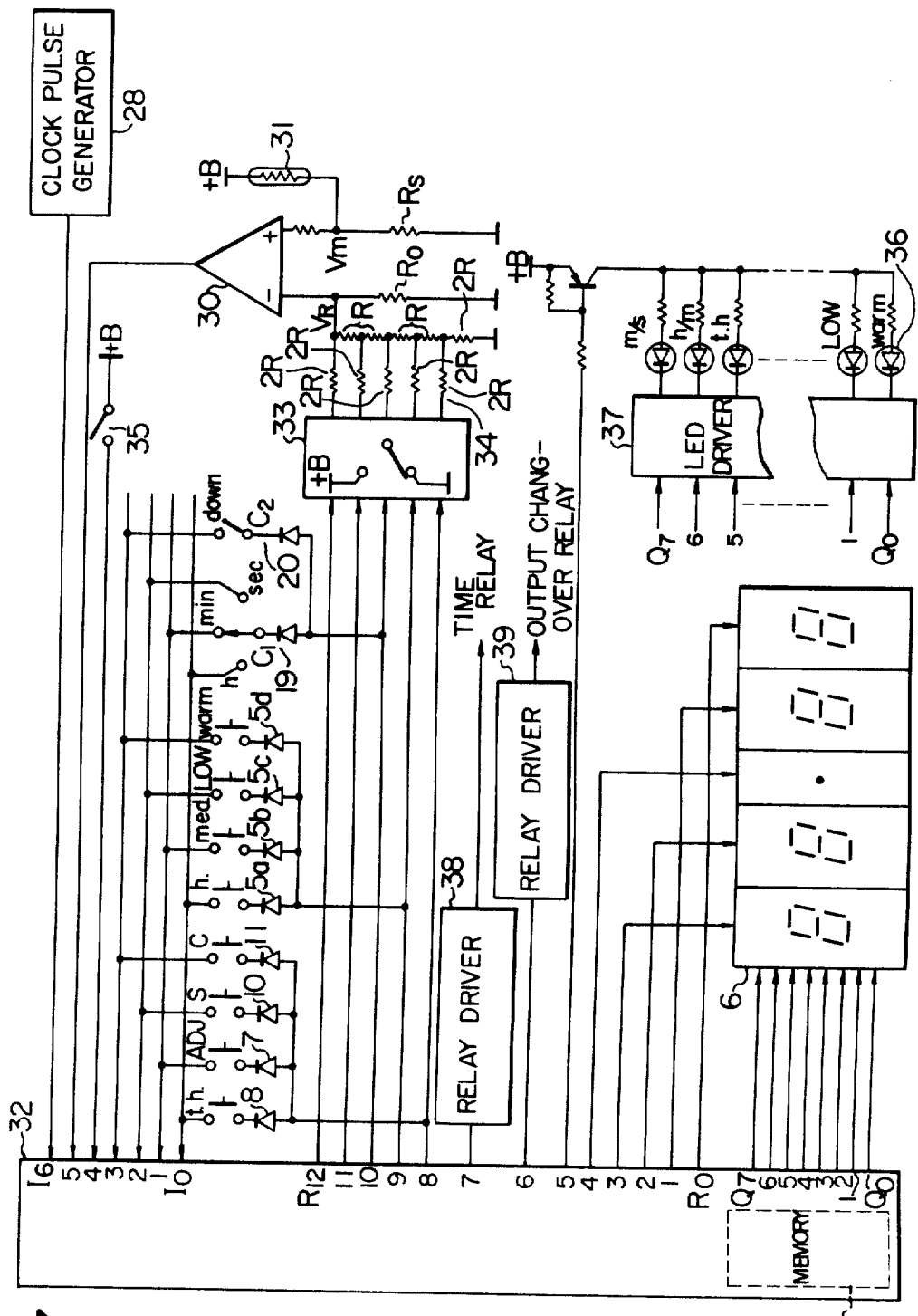
FIG. 7 is a detailed circuit diagram for the block diagram of FIG. 6.

Next, the present invention will be described with reference to a more detailed circuit construction. FIG. 7 illustrates such a circuit diagram. The main control unit 21 and the memory 24 are incorporated in a one-chip microcomputer 32. The function selecting means 22 is formed of a key matrix including the eight keys, i.e., the temp. hold key 8, the ADJ key 7, the clear key 11, the high key 5a, the medium key 5b, the low key 5c and the warm key 5d. The impulse generator is also incorporated as a part of the key matrix. The four contacts of the digit change-over switch 19 and the increment/decrement switch 20 are scanned by an output port $R_{10}$ of the microcomputer 32. The function keys are scanned by output ports $R_8$ and $R_9$. The timing of the individual elements will be described later with reference to FIG. 8.

The outputs $R_8$ to $R_{12}$ also serve as digital reference signals which are in turn converted to an analog reference voltage $V_R$ by a switching element 33 such as a C-MOS buffer and a ladder circuit 34. On the other hand, the temperature sensor 31 is connected in series with a reference resistor $R_S$ so that a change of its resistance value with temperature is converted to a change of a voltage Vm and the latter is compared with the reference voltage $V_R$ in the comparator 30 whose output is applied to an input port $I_5$ of the microcomputer 32.

In addition to these inputs, the microcomputer 32 receives at its input port $I_6$ the clock pulses from the clock pulse generator 28 as a time base for the timer means 26 and at its input port $I_4$ the output of a door switch 35 which opens and closes in response to the opening and closing of the door 2.

The four-digit display unit 6 comprises fluorescent display tubes and the digits are respectively scanned by the outputs $R_0$ to $R_4$ for dynamic lighting. Symbols $Q_0$ to $Q_7$ designate data ports for supplying the segment data to the respective digits. These data ports also feed the turnon data to status displays 36 comprising LEDs and these displays are scanned by the output $R_5$ for dynamic lighting. Numeral 37 designates an LED driver. The timer means 26 comprising a time relay is controlled by the output $R_7$ and the output changeover means 27 comprising an output change-over relay is controlled by the output $R_6$. The relays are inserted in the main circuit and they govern the supply of current to the magnetron 13. Numerals 38 and 39 designate relay drivers.

Figure 8:
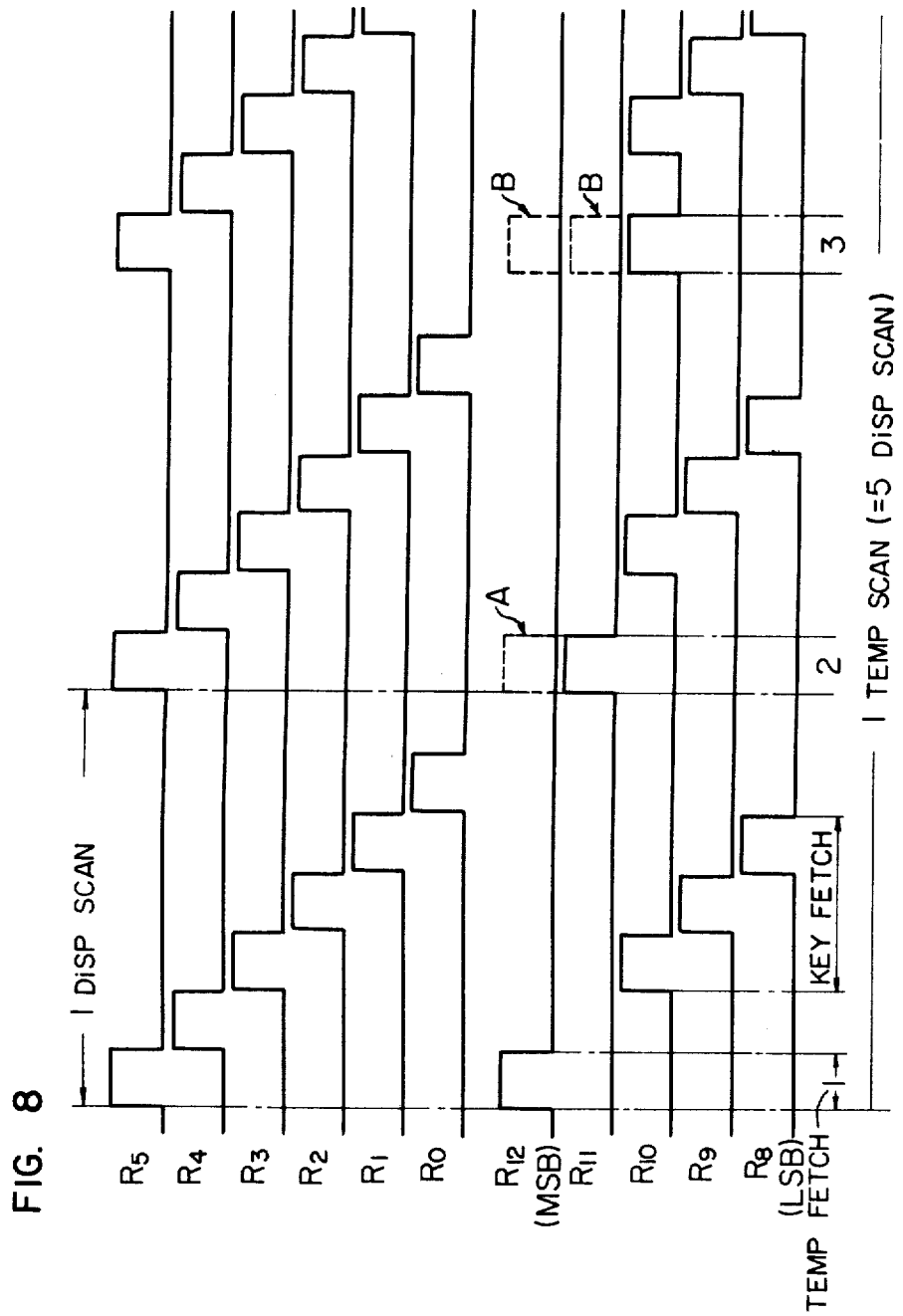
FIG. 8 is a timing chart for explaining the operation of the circuitry shown in FIG. 7.

FIG. 8 is a timing chart showing the timing of the dynamic lighting and the dynamic temperature scanning in the circuitry of FIG. 7. In the case of FIG. 7, the switching element 33 is comprised of a C-MOS inverter and the temperature sensor 31 is comprised of an element having a negative resistance, such as, a thermistor. The display unit 6 is time-shared in accordance with the six timings of the outputs $R_5$ to $R_0$. On the other hand, the temperature sensor circuit is supplied with a reference voltage in response to the timing of the output $R_5$ and the measurement of the sensor voltage is effected (TEMP FETCH mode). The first scan provides "10000" and thus an analog reference voltage of $V_B/2$ is applied to the comparator 30. In this case, depending on whether the measured value Vm of the temperature sensor 31 is greater or smaller than $V_B/2$, the reference voltage of the following second scan becomes $V_B/4$ or $(V_B/2)+(V_B/4)$. By repeating this procedure five times, it is possible to detect the current temperature of the temperature sensor 31. In FIG. 8, the dotted lines (the arrows A and B) indicate the cases in which the value of the temperature sensor 31 is higher than the reference voltage generated in the preceding TEMP FETCH mode.

In this way, the display unit 6 is dynamically lighted in accordance with the six timings and the reading of the temperature sensor 31 is effected by repeating this display scan five times.

On the other hand, the key matrix is controlled in accordance with the timing of the outputs $R_3$, $R_2$ and $R_1$ and the respective keys and the impulse generator are scanned by the outputs $R_{10}$, $R_9$ and $R_8$ (KEY FETCH). With these timings, the reading of the temperature sensor 31 is not performed by the main control unit 21 and thus the reference signals $R_{12}$ to $R_8$ can be used for other purpose as desired.

While, in the embodiment described above, the sensor comprises a temperature sensor, the present invention can of course be applied to applications where any other sensor such as a humidity sensor for sensing the vapor generated from an object to be heated, a gas sensor responsive to any of various gases or an infrared sensor having an excellent sensitivity to infrared ray is used and a certain value of the sensor at the completion of heating can be preset as a physical quantity or a mere code for the main control unit.

What is claimed is:

1. A heating apparatus comprising:
a heating chamber for accommodating therein an object to be heated;
heating means for supplying heat energy to said heating chamber;
timer means for controlling the period of time during which power is supplied to said heating means;
output change-over means for varying the output level of said heating means;
a main control unit for controlling said timer means and said output change-over means in accordance with a preset heating time and a preset output level of said heating means, said main control unit including a counter and a memory;
output selection means coupled to said main control unit, said output selection means including a plurality of output keys respectively representing different output levels of said heating means, depression of one of said output keys selecting a corresponding output level and simultaneously a heating time corresponding to the length of time said one output key is depressed;
numerical value input means coupled to said main control unit, said numerical value input means including a digit change-over switch for selecting a digit position representing a unit of heating time including at least one of hour, minute and second units and for selecting an increment or decrement position to progressively increase or decrease the numerical value of the heating time whereby, upon depressing the one of said output keys after selecting the digit position by said digit change-over switch, the output level corresponding to the depressed one output key is preset in said memory, and said counter counts the length of time of the depression of said one output key to progressively increase the numerical value of the heating time for the selected unit when said digit change-over switch is in the increment position, said counter counting the length of time of the depression to progressively decrease when said digital change-over switch is in the decrement position, the counted heating time being preset in said memory; and
display means connected to said main unit for displaying digitally the counted heating time.

2. A heating apparatus according to claim 1 which further comprises a temperature sensor for sensing one of the temperature of said object to be heated and the temperature in said heating chamber, the temperature to which said object is to be heated being inputted to said main control unit by said numerical value input means and said output selecting means so long as one of said output keys is depressed, said counter successively increasing or decreasing the heating temperature in accordance with the output level of said one output key in said memory, said display means displaying digitally said increased or decreased heating temperature.

3. A heating apparatus according to claim 1, wherein said display means includes at least a four-digit numerical display, an hours and minutes status display and a minutes and seconds status display, and wherein said main control unit detects the position of said digit change-over switch of said numerical value input means and the magnitude of an inputted heating time, whereby said hours and minutes status display and said minutes and seconds status display are selectively turned on or flashed on and off indicating whether said numerical display unit is functioning as an hours and minutes display or a minutes and seconds display.

* * * * *